United States Patent
Shirogane et al.

(10) Patent No.: US 8,074,108 B2
(45) Date of Patent: Dec. 6, 2011

(54) STORAGE CONTROLLER AND STORAGE CONTROL METHOD

(75) Inventors: Tetsuya Shirogane, Odawara (JP); Azuma Kano, Hiratsuka (JP); Ikuya Yagisawa, Machida (JP)

(73) Assignee: Hitachi, Ltd., Tokyo (JP)

( * ) Notice: Subject to any disclaimer, the term of this patent is extended or adjusted under 35 U.S.C. 154(b) by 315 days.

(21) Appl. No.: 12/014,233

(22) Filed: Jan. 15, 2008

(65) Prior Publication Data

US 2008/0263393 A1    Oct. 23, 2008

(30) Foreign Application Priority Data

Apr. 17, 2007   (JP) ................................ 2007-108633

(51) Int. Cl.
  *G06F 11/00* (2006.01)
(52) U.S. Cl. ..................... 714/6.32; 714/6.22
(58) Field of Classification Search ................. 714/6, 7, 714/6.22, 6.32
  See application file for complete search history.

(56) References Cited

U.S. PATENT DOCUMENTS

| | | | |
|---|---|---|---|
| 5,651,133 A | 7/1997 | Burkes et al. | |
| 5,915,081 A | 6/1999 | Yamamoto et al. | |
| 6,041,421 A * | 3/2000 | Yamamoto | 714/7 |
| 6,598,174 B1 * | 7/2003 | Parks et al. | 714/6 |
| 7,249,277 B2 * | 7/2007 | Arai et al. | 714/6 |
| 7,383,380 B2 * | 6/2008 | Yagisawa et al. | 711/114 |
| 7,457,981 B2 * | 11/2008 | Morita | 714/7 |
| 7,533,292 B2 * | 5/2009 | Van Gundy et al. | 714/7 |
| 2003/0217305 A1 * | 11/2003 | Krehbiel et al. | 714/6 |
| 2005/0102552 A1 * | 5/2005 | Horn | 714/6 |
| 2007/0028145 A1 * | 2/2007 | Gerhard et al. | 714/36 |
| 2007/0067666 A1 | 3/2007 | Ishikawa et al. | |
| 2008/0126839 A1 * | 5/2008 | Sangapu et al. | 714/5 |
| 2008/0126849 A1 * | 5/2008 | Kotzur et al. | 714/7 |
| 2008/0244309 A1 * | 10/2008 | Fukuyama | 714/6 |

FOREIGN PATENT DOCUMENTS

| | | |
|---|---|---|
| JP | 6-139027 | 5/1994 |
| JP | 7-146760 | 6/1995 |
| JP | 08221875 | 8/1996 |
| JP | 11-191037 | 7/1999 |
| JP | 2002-297322 | 10/2002 |
| JP | 2007087039 | 4/2007 |

* cited by examiner

Primary Examiner — Joshua Lohn
(74) Attorney, Agent, or Firm — Brundidge & Stanger, P.C.

(57) ABSTRACT

Spare disk drives are provided to a chassis for storing storage devices, and, when any one of the storage devices configuring RAID fails, the storage controller copies data of the failed storage device to a spare storage device, and recognizes an additional storage device inserted into the spare disk drive as the spare storage device. Thereafter, when the foregoing storage device fails, the storage controller reproduces data of the failed storage device, copies this data to an additional storage device inserted into the spare disk drive, and recognizes the additional storage device inserted into the spare disk drive as a spare storage device. Subsequently, when the foregoing storage device fails, the storage controller reproduces data of the failed storage device and copies this data to an additional storage device inserted into the spare disk drive. RAID 6 is maintained thereby.

10 Claims, 23 Drawing Sheets

FIG. 5A

| DRIVE# | 0 | 1 | 2 | 3 | 4 | 5 | 6 | 7 | 8 | 9 | 10 | 11 | R0 | R1 |
|---|---|---|---|---|---|---|---|---|---|---|---|---|---|---|
| SLOT | INSTALLED | INSTALLED | INSTALLED | INSTALLED | INSTALLED | INSTALLED | INSTALLED | INSTALLED | INSTALLED | INSTALLED | INSTALLED | INSTALLED | EMPTY | EMPTY |
| STATUS | NORMAL | NORMAL | NORMAL | NORMAL | NORMAL | NORMAL | NORMAL | NORMAL | NORMAL | NORMAL | NORMAL | NORMAL | N/A | N/A |
| CONFIG. | RG0 | RG0 | RG0 | RG0 | RG0 | RG0 | RG0 | RG0 | RG0 | RG0 | RG0 | SPARE | N/A | N/A |
| DRIVE POWER | ON | ON | ON | ON | ON | ON | ON | ON | ON | ON | ON | OFF | N/A | N/A |

| RAID GROUP# | CONFIGURATION | DRIVES | STATUS |
|---|---|---|---|
| RG0 | RAID6(9D+2P) | (0, 1, 2, 3, 4, 5, 6, 7, 8, 9, 10) | NORMAL |
| . | . | . | . |

FIG. 5B

| DRIVE# | 0 | 1 | 2 | 3 | 4 | 5 | 6 | 7 | 8 | 9 | 10 | 11 | R0 | R1 |
|---|---|---|---|---|---|---|---|---|---|---|---|---|---|---|
| SLOT | INSTALLED | INSTALLED | INSTALLED | INSTALLED | INSTALLED | INSTALLED | INSTALLED | INSTALLED | INSTALLED | INSTALLED | INSTALLED | INSTALLED | EMPTY | EMPTY |
| STATUS | NORMAL | NORMAL | NORMAL | NORMAL | FAILURE | NORMAL | NORMAL | NORMAL | NORMAL | NORMAL | NORMAL | NORMAL | N/A | N/A |
| CONFIG. | RG0 | RG0 | RG0 | RG0 | RG0 | RG0 | RG0 | RG0 | RG0 | RG0 | RG0 | SPARE | N/A | N/A |
| DRIVE POWER | ON | ON | ON | ON | ON | ON | ON | ON | ON | ON | ON | OFF | N/A | N/A |

| RAID GROUP# | CONFIGURATION | DRIVES | STATUS |
|---|---|---|---|
| RG0 | RAID5(9D+1P) | (0, 1, 2, 3, -5, 6, 7, 8, 9, 10) | WARNING |
| . | . | . | . |

FIG. 5C

| DRIVE# | 0 | 1 | 2 | 3 | 4 | 5 | 6 | 7 | 8 | 9 | 10 | 11 | R0 | R1 |
|---|---|---|---|---|---|---|---|---|---|---|---|---|---|---|
| SLOT | INSTALLED | INSTALLED | INSTALLED | INSTALLED | INSTALLED | INSTALLED | INSTALLED | INSTALLED | INSTALLED | INSTALLED | INSTALLED | INSTALLED | EMPTY | EMPTY |
| STATUS | NORMAL | NORMAL | NORMAL | NORMAL | FAILURE | NORMAL | NORMAL | NORMAL | NORMAL | NORMAL | NORMAL | NORMAL | N/A | N/A |
| CONFIG. | RG0 | RG0 | RG0 | RG0 | RG0 | RG0 | RG0 | RG0 | RG0 | RG0 | RG0 | SPARE | N/A | N/A |
| DRIVE POWER | ON | ON | ON | ON | ON | ON | ON | ON | ON | ON | ON | WAKE UP | N/A | N/A |

| RAID GROUP# | CONFIGURATION | DRIVES | STATUS |
|---|---|---|---|
| RG0 | RAID5(9D+1P) | (0, 1, 2, 3, -5, 6, 7, 8, 9, 10) | WARNING |
| . | . | . | . |

FIG. 5D

| DRIVE# | 0 | 1 | 2 | 3 | 4 | 5 | 6 | 7 | 8 | 9 | 10 | 11 | R0 | R1 |
|---|---|---|---|---|---|---|---|---|---|---|---|---|---|---|
| SLOT | INSTALLED | INSTALLED | INSTALLED | INSTALLED | INSTALLED | INSTALLED | INSTALLED | INSTALLED | INSTALLED | INSTALLED | INSTALLED | INSTALLED | EMPTY | EMPTY |
| STATUS | NORMAL | NORMAL | NORMAL | NORMAL | FAILURE | NORMAL | NORMAL | NORMAL | NORMAL | NORMAL | NORMAL | NORMAL | N/A | N/A |
| CONFIG. | RG0 | RG0 | RG0 | RG0 | N/A | RG0 | RG0 | RG0 | RG0 | RG0 | RG0 | SPARE | N/A | N/A |
| DRIVE POWER | ON | ON | ON | ON | OFF | ON | ON | ON | ON | ON | ON | ON | N/A | N/A |

| RAID GROUP# | CONFIGURATION | DRIVES | STATUS |
|---|---|---|---|
| RG0 | RAID5(9D+1P) | (0, 1, 2, 3, -5, 6, 7, 8, 9, 10) | WARNING |
| . | . | . | . |

| DRIVE# | 0 | 1 | 2 | 3 | 4 | 5 | 6 | 7 | 8 | 9 | 10 | 11 | R0 | R1 |
|---|---|---|---|---|---|---|---|---|---|---|---|---|---|---|
| SLOT | INSTALLED | INSTALLED | INSTALLED | INSTALLED | INSTALLED | INSTALLED | INSTALLED | INSTALLED | INSTALLED | INSTALLED | INSTALLED | INSTALLED | EMPTY | EMPTY |
| STATUS | NORMAL | NORMAL | NORMAL | NORMAL | FAILURE | NORMAL | NORMAL | NORMAL | NORMAL | NORMAL | NORMAL | CORRECTION | N/A | N/A |
| CONFIG. | RG0 | RG0 | RG0 | RG0 | N/A | RG0 | RG0 | RG0 | RG0 | RG0 | RG0 | RG0 | N/A | N/A |
| DRIVE POWER | ON | ON | ON | ON | ON | ON | ON | ON | ON | ON | ON | ON | N/A | N/A |

| RAID GROUP# | CONFIGURATION | DRIVES | STATUS |
|---|---|---|---|
| RG0 | RAID5(9D+1P) | (0, 1, 2, 3, -5, 6, 7, 8, 9, 10) | WARNING |
| . | . | . | . |

*FIG. 5E*

| DRIVE# | 0 | 1 | 2 | 3 | 4 | 5 | 6 | 7 | 8 | 9 | 10 | 11 | R0 | R1 |
|---|---|---|---|---|---|---|---|---|---|---|---|---|---|---|
| SLOT | INSTALLED | INSTALLED | INSTALLED | INSTALLED | INSTALLED | INSTALLED | INSTALLED | INSTALLED | INSTALLED | INSTALLED | INSTALLED | INSTALLED | EMPTY | EMPTY |
| STATUS | NORMAL | NORMAL | NORMAL | NORMAL | FAILURE | NORMAL | NORMAL | NORMAL | NORMAL | NORMAL | NORMAL | NORMAL | N/A | N/A |
| CONFIG. | RG0 | RG0 | RG0 | RG0 | N/A | RG0 | RG0 | RG0 | RG0 | RG0 | RG0 | SPARE | N/A | N/A |
| DRIVE POWER | ON | ON | ON | ON | ON | ON | ON | ON | ON | ON | ON | OFF | N/A | N/A |

| RAID GROUP# | CONFIGURATION | DRIVES | STATUS |
|---|---|---|---|
| RG0 | RAID6(9D+2P) | (0, 1, 2, 3, 11, 5, 6, 7, 8, 9, 10) | NORMAL |
| . | . | . | . |

| DRIVE# | 0 | 1 | 2 | 3 | 4 | 5 | 6 | 7 | 8 | 9 | 10 | 11 | R0 | R1 |
|---|---|---|---|---|---|---|---|---|---|---|---|---|---|---|
| SLOT | INSTALLED | INSTALLED | INSTALLED | INSTALLED | INSTALLED | INSTALLED | INSTALLED | INSTALLED | INSTALLED | INSTALLED | INSTALLED | INSTALLED | INSTALLED | EMPTY |
| STATUS | NORMAL | NORMAL | NORMAL | NORMAL | FAILURE | NORMAL | NORMAL | NORMAL | NORMAL | NORMAL | NORMAL | NORMAL | VERIFYING | N/A |
| CONFIG. | RG0 | RG0 | RG0 | RG0 | N/A | RG0 | RG0 | RG0 | RG0 | RG0 | RG0 | RG0 | N/A | N/A |
| DRIVE POWER | ON | ON | ON | ON | ON | ON | ON | ON | ON | ON | ON | ON | N/A | N/A |

| RAID GROUP# | CONFIGURATION | DRIVES | STATUS |
|---|---|---|---|
| RG0 | RAID6(9D+2P) | (0, 1, 2, 3, 11, 5, 6, 7, 8, 9, 10) | NORMAL |
| . | . | . | . |

FIG. 5H

| DRIVE# | 0 | 1 | 2 | 3 | 4 | 5 | 6 | 7 | 8 | 9 | 10 | 11 | R0 | R1 |
|---|---|---|---|---|---|---|---|---|---|---|---|---|---|---|
| SLOT | INSTALLED | INSTALLED | INSTALLED | INSTALLED | INSTALLED | INSTALLED | INSTALLED | INSTALLED | INSTALLED | INSTALLED | INSTALLED | INSTALLED | INSTALLED | EMPTY |
| STATUS | NORMAL | NORMAL | NORMAL | NORMAL | FAILURE | NORMAL | NORMAL | NORMAL | NORMAL | NORMAL | NORMAL | NORMAL | SPARE | N/A |
| CONFIG. | RG0 | RG0 | RG0 | RG0 | N/A | RG0 | RG0 | RG0 | RG0 | RG0 | RG0 | RG0 | ON | N/A |
| DRIVE POWER | ON | ON | ON | ON | ON | ON | ON | ON | ON | ON | ON | ON | ON | N/A |

| RAID GROUP# | CONFIGURATION | DRIVES | STATUS |
|---|---|---|---|
| RG0 | RAID6(9D+2P) | (0, 1, 2, 3, 11, 5, 6, 7, 8, 9, 10) | NORMAL |
| . | . | . | . |

FIG. 6A

| DRIVE# | 0 | 1 | 2 | 3 | 4 | 5 | 6 | 7 | 8 | 9 | 10 | 11 | R0 | R1 |
|---|---|---|---|---|---|---|---|---|---|---|---|---|---|---|
| SLOT | INSTALLED | INSTALLED | INSTALLED | INSTALLED | INSTALLED | INSTALLED | INSTALLED | INSTALLED | INSTALLED | INSTALLED | INSTALLED | INSTALLED | INSTALLED | EMPTY |
| STATUS | NORMAL | NORMAL | NORMAL | NORMAL | FAILURE | NORMAL | NORMAL | NORMAL | NORMAL | FAILURE | NORMAL | NORMAL | NORMAL | N/A |
| CONFIG. | RG0 | RG0 | RG0 | RG0 | N/A | RG0 | RG0 | RG0 | RG0 | RG0 | RG0 | RG0 | SPARE | N/A |
| DRIVE POWER | ON | ON | ON | ON | ON | ON | ON | ON | ON | ON | ON | ON | OFF | N/A |

— 60

| RAID GROUP# | CONFIGURATION | DRIVES | STATUS |
|---|---|---|---|
| RG0 | RAID5(9D+1P) | (0, 1, 2, 3, 11, 5, 6, 7, 8, 9, 10) | WARNING |
| . | . | . | . |

| DRIVE# | 0 | 1 | 2 | 3 | 4 | 5 | 6 | 7 | 8 | 9 | 10 | 11 | R0 | R1 |
|---|---|---|---|---|---|---|---|---|---|---|---|---|---|---|
| SLOT | INSTALLED | INSTALLED | INSTALLED | INSTALLED | INSTALLED | INSTALLED | INSTALLED | INSTALLED | INSTALLED | INSTALLED | INSTALLED | INSTALLED | INSTALLED | EMPTY |
| STATUS | NORMAL | NORMAL | NORMAL | NORMAL | FAILURE | NORMAL | NORMAL | NORMAL | NORMAL | FAILURE | NORMAL | NORMAL | NORMAL | N/A |
| CONFIG. | RG0 | RG0 | RG0 | RG0 | N/A | RG0 | RG0 | RG0 | RG0 | N/A | RG0 | SPARE | SPARE | N/A |
| DRIVE POWER | ON | ON | ON | ON | ON | ON | ON | ON | ON | OFF | ON | OFF | OFF | N/A |

— 60

| RAID GROUP# | CONFIGURATION | DRIVES | STATUS |
|---|---|---|---|
| RG0 | RAID5(9D+1P) | (0, 1, 2, 3, 11, 5, 6, 7, 8, 9, 10) | WARNING |
| . | . | . | . |

| DRIVE# | 0 | 1 | 2 | 3 | 4 | 5 | 6 | 7 | 8 | 9 | 10 | 11 | R0 | R1 |
|---|---|---|---|---|---|---|---|---|---|---|---|---|---|---|
| SLOT | INSTALLED | INSTALLED | INSTALLED | INSTALLED | INSTALLED | INSTALLED | INSTALLED | INSTALLED | INSTALLED | INSTALLED | INSTALLED | INSTALLED | INSTALLED | EMPTY |
| STATUS | NORMAL | NORMAL | NORMAL | NORMAL | FAILURE | NORMAL | NORMAL | NORMAL | NORMAL | FAILURE | NORMAL | NORMAL | NORMAL | N/A |
| CONFIG. | RG0 | RG0 | RG0 | RG0 | N/A | RG0 | RG0 | RG0 | RG0 | N/A | RG0 | RG0 | SPARE | N/A |
| DRIVE POWER | ON | ON | ON | ON | ON | ON | ON | ON | ON | OFF | ON | ON | WAKE UP | N/A |

| RAID GROUP# | CONFIGURATION | DRIVES | STATUS |
|---|---|---|---|
| RG0 | RAID5(9D+1P) | (0, 1, 2, 3, 11, 5, 6, 7, 8, 9, 10) | WARNING |
| . | . | . | . |

FIG. 6D

| DRIVE# | 0 | 1 | 2 | 3 | 4 | 5 | 6 | 7 | 8 | 9 | 10 | 11 | R0 | R1 |
|---|---|---|---|---|---|---|---|---|---|---|---|---|---|---|
| SLOT | INSTALLED | INSTALLED | INSTALLED | INSTALLED | INSTALLED | INSTALLED | INSTALLED | INSTALLED | INSTALLED | INSTALLED | INSTALLED | INSTALLED | INSTALLED | EMPTY |
| STATUS | NORMAL | NORMAL | NORMAL | NORMAL | FAILURE | NORMAL | NORMAL | NORMAL | NORMAL | FAILURE | NORMAL | NORMAL | CORRECTION | N/A |
| CONFIG. | RG0 | RG0 | RG0 | RG0 | N/A | RG0 | RG0 | RG0 | RG0 | N/A | RG0 | RG0 | RG | N/A |
| DRIVE POWER | ON | ON | ON | ON | ON | ON | ON | ON | ON | OFF | ON | ON | ON | N/A |

| RAID GROUP# | CONFIGURATION | DRIVES | STATUS |
|---|---|---|---|
| RG0 | RAID6(9D+2P) | (0, 1, 2, 3, 11, 5, 6, 7, 8, 9, -10) | NORMAL |
| . | . | . | . |

FIG. 6E

| DRIVE# | 0 | 1 | 2 | 3 | 4 | 5 | 6 | 7 | 8 | 9 | 10 | 11 | R0 | R1 |
|---|---|---|---|---|---|---|---|---|---|---|---|---|---|---|
| SLOT | INSTALLED | INSTALLED | INSTALLED | INSTALLED | INSTALLED | INSTALLED | INSTALLED | INSTALLED | INSTALLED | INSTALLED | INSTALLED | INSTALLED | INSTALLED | EMPTY |
| STATUS | NORMAL | NORMAL | NORMAL | NORMAL | FAILURE | NORMAL | NORMAL | NORMAL | NORMAL | FAILURE | NORMAL | NORMAL | NORMAL | N/A |
| CONFIG. | RG0 | RG0 | RG0 | RG0 | N/A | RG0 | RG0 | RG0 | RG0 | N/A | RG0 | RG0 | RG | N/A |
| DRIVE POWER | ON | ON | ON | ON | ON | ON | ON | ON | ON | OFF | ON | ON | ON | N/A |

60

| RAID GROUP# | CONFIGURATION | DRIVES | STATUS |
|---|---|---|---|
| RG0 | RAID6(9D+2P) | (0, 1, 2, 3, 11, 5, 6, 7, 8, R0, 10) | NORMAL |
| . | . | . | . |

| DRIVE# | 0 | 1 | 2 | 3 | 4 | 5 | 6 | 7 | 8 | 9 | 10 | 11 | R0 | R1 |
|---|---|---|---|---|---|---|---|---|---|---|---|---|---|---|
| SLOT | INSTALLED | INSTALLED | INSTALLED | INSTALLED | INSTALLED | INSTALLED | INSTALLED | INSTALLED | INSTALLED | INSTALLED | INSTALLED | INSTALLED | INSTALLED | EMPTY |
| STATUS | NORMAL | NORMAL | NORMAL | NORMAL | FAILURE | NORMAL | FAILURE | NORMAL | NORMAL | FAILURE | NORMAL | NORMAL | NORMAL | N/A |
| CONFIG. | RG0 | RG0 | RG0 | RG0 | N/A | RG0 | N/A | RG0 | RG0 | N/A | RG0 | RG0 | RG | N/A |
| DRIVE POWER | ON | ON | ON | ON | OFF | ON | OFF | ON | ON | OFF | ON | ON | ON | N/A |

60

| RAID GROUP# | CONFIGURATION | DRIVES | STATUS |
|---|---|---|---|
| RG0 | RAID5(9D+1P) | (0, 1, 2, 3, 11, 5, 6, 7, 8, R0, -10) | WARNING |
| . | . | . | . |

| DRIVE# | 0 | 1 | 2 | 3 | 4 | 5 | 6 | 7 | 8 | 9 | 10 | 11 | R0 | R1 |
|---|---|---|---|---|---|---|---|---|---|---|---|---|---|---|
| SLOT | INSTALLED | INSTALLED | INSTALLED | INSTALLED | INSTALLED | INSTALLED | INSTALLED | INSTALLED | INSTALLED | INSTALLED | INSTALLED | INSTALLED | INSTALLED | INSTALLED |
| STATUS | NORMAL | NORMAL | NORMAL | NORMAL | FAILURE | NORMAL | FAILURE | NORMAL | NORMAL | FAILURE | NORMAL | NORMAL | NORMAL | NORMAL |
| CONFIG. | RG0 | RG0 | RG0 | RG0 | N/A | RG0 | N/A | RG0 | RG0 | N/A | RG0 | RG0 | RG | RG |
| DRIVE POWER | ON | ON | ON | ON | ON | ON | OFF | ON | ON | OFF | ON | ON | ON | ON |

60

| RAID GROUP# | CONFIGURATION | DRIVES | STATUS |
|---|---|---|---|
| RG0 | RAID6(9D+2P) | (-, 1, 2, 3, 11, 5, R1, 7, 8, R0, 10) | NORMAL |
| . | . | . | . |

| DRIVE# | 0 | 1 | 2 | 3 | 4 | 5 | 6 | 7 | 8 | 9 | 10 | 11 | R0 | R1 |
|---|---|---|---|---|---|---|---|---|---|---|---|---|---|---|
| SLOT | INSTALLED | INSTALLED | INSTALLED | INSTALLED | INSTALLED | INSTALLED | INSTALLED | INSTALLED | INSTALLED | INSTALLED | INSTALLED | INSTALLED | INSTALLED | INSTALLED |
| STATUS | FAILURE | NORMAL | NORMAL | NORMAL | FAILURE | NORMAL | FAILURE | NORMAL | NORMAL | FAILURE | NORMAL | NORMAL | NORMAL | NORMAL |
| CONFIG. | N/A | RG0 | RG0 | RG0 | N/A | RG0 | N/A | RG0 | RG0 | N/A | RG0 | RG0 | RG | RG |
| DRIVE POWER | OFF | ON | ON | ON | ON | ON | OFF | ON | ON | OFF | ON | ON | ON | ON |

60

| RAID GROUP# | CONFIGURATION | DRIVES | STATUS |
|---|---|---|---|
| RG0 | RAID5(9D+1P) | (-, 1, 2, 3, 11, 5, R1, 7, 8, R0, 10) | WARNING |
| . | . | . | . |

62

| DRIVE# | 0 | 1 | 2 | 3 | 4 | 5 | 6 | 7 | 8 | 9 | 10 | 11 | R0 | R1 |
|---|---|---|---|---|---|---|---|---|---|---|---|---|---|---|
| SLOT | INSTALLED | INSTALLED | INSTALLED | INSTALLED | INSTALLED | INSTALLED | INSTALLED | INSTALLED | INSTALLED | INSTALLED | INSTALLED | INSTALLED | INSTALLED | INSTALLED |
| STATUS | FAILURE | NORMAL | NORMAL | NORMAL | FAILURE | NORMAL | FAILURE | NORMAL | NORMAL | FAILURE | NORMAL | NORMAL | NORMAL | NORMAL |
| CONFIG. | N/A | RG0 | RG0 | RG0 | N/A | RG0 | N/A | RG0 | RG0 | N/A | RG0 | RG0 | RG0 | RG0 |
| DRIVE POWER | OFF | ON | ON | ON | ON | ON | OFF | ON | ON | OFF | ON | ON | ON | ON |

| RAID GROUP# | CONFIGURATION | DRIVES | STATUS |
|---|---|---|---|
| RG0 | RAID5(9D+1P) | (-, 1, 2, 3, 11, 5, R1, 7, 8, R0, 10) | WARNING |
| . | . | . | . |

FIG. 6I

| DRIVE# | 0 | 1 | 2 | 3 | 4 | 5 | 6 | 7 | 8 | 9 | 10 | 11 | R0 | R1 |
|---|---|---|---|---|---|---|---|---|---|---|---|---|---|---|
| SLOT | INSTALLED | INSTALLED | INSTALLED | INSTALLED | INSTALLED | INSTALLED | INSTALLED | INSTALLED | INSTALLED | INSTALLED | INSTALLED | INSTALLED | INSTALLED | INSTALLED |
| STATUS | FAILURE | NORMAL | NORMAL | NORMAL | FAILURE | FAILURE | FAILURE | NORMAL | NORMAL | FAILURE | NORMAL | NORMAL | NORMAL | NORMAL |
| CONFIG. | N/A | RG0 | RG0 | RG0 | N/A | N/A | N/A | RG0 | RG0 | N/A | RG0 | RG0 | RG0 | RG0 |
| DRIVE POWER | OFF | ON | ON | ON | ON | OFF | OFF | ON | ON | OFF | ON | ON | ON | ON |

| RAID GROUP# | CONFIGURATION | DRIVES | STATUS |
|---|---|---|---|
| RG0 | RAID0(9D) | (-, 1, 2, 3, 11, -, R1, 7, 8, R0, 10) | DANGER |
| . | . | . | . |

FIG. 6J

STORAGE CONTROLLER AND STORAGE CONTROL METHOD

CROSS REFERENCES

This application relates to and claims priority from Japanese Patent Application No. 2007-108633, filed on Apr. 17, 2007, the entire disclosure of which is incorporated herein by reference.

BACKGROUND

The present invention generally relates to a storage controller and a storage control method, and in particular relates to a storage controller connected to a host system and which stores data to be sent to and received from the host system in an HDD (Hard Disk Drive) as a storage device according to a RAID (Redundant Arrays of Inexpensive Disks) system, and to the storage control method thereof.

As this type of storage controller, for instance, known is a type comprising a drive with a rotating storage device for storing data, and a storage controller interposed between the drive and a host system and which controls the sending and receiving of data between the drive and the host system (refer to Japanese Patent Laid-Open Publication No. H11-191037; "Patent Document 1").

Patent Document 1 describes recovering, when a disk drive fails and becomes inoperative, all data of the failed drive from the remaining drives of the ECC group (RAID group) and copying such data to a spare disk drive (correction copy).

Further, a storage control system comprising a spare disk drive has been proposed for recovering, when one of the disk drives configuring RAID fails, data from the other disk drives configuring RAID, and recovering the status from the degenerate status of RAID to the normal access status where all disk drives configuring RAID are operable (refer to Japanese Patent Laid-Open Publication No. 2002-297322; "Patent Document 2").

Moreover, a storage control system has been proposed comprising a disk array controller, a disk drive connected to a disk array controller via a drive interface and for storing a plurality of data aligned in an array, and a data backup device for backing up data stored in the disk drive, wherein a plurality of disk drives are used as spare disk drives, and the remaining disk drives are used as data/parity disk drives for storing data and the like, and a spare disk drive is used as a data/parity disk drive in substitute for the failed data/parity disk drive (refer to Japanese Patent Laid-Open Publication No. H6-139027).

In addition, as a storage controller, known is a rack mount-type disk array apparatus. With this rack mount-type disk array apparatus, a plurality of hard disk units and an interface unit are provided replaceably inside a rack mounted on the chassis. When replacing the hard disk unit, the user removes the hard disk unit to be replaced from the front face of the chassis, and mounts a new hard disk unit.

Meanwhile, in order to facilitate the maintenance associated with a failure of a disk drive, a method is being attempted of making the failed disk drive subject to a failure unexchangeable, and, when a disk drive configuring RAID fails, mounting a repair disk drive in a spare disk drive, and using the repair disk drive in substitute for the failed disk drive. Here, when one of the disk drives configuring RAID fails, data can be reproduced from the other disk drives configuring RAID and stored in the spare disk drive, the spare disk drive can be configured as a data disk drive, and the repair disk drive mounted in the spare disk drive can be configured as a spare disk drive (refer to Patent Document 2). Incidentally, a storage controller that sends and receives information to and from a host computer has also been proposed (refer to Japanese Patent Laid-Open Publication No. H7-146760).

SUMMARY

Nevertheless, with the conventional technology, when a repair disk drive is inserted into a spare disk drive, the operation was troublesome since the operation of configuring the repair disk drive as a spare disk drive was conducted manually. Further, when considering the maintenance cost and workability, if the number of spare disk drives is increased, although a failed disk drive can be dealt with by inserting a repair disk into repair slot each time a failure occurs to a disk drive configuring RAID, there is a problem in that the maintenance cost will increase. Contrarily, if there is not enough spare disk drives, it will not be possible to deal with malfunctions if a plurality of disk drives configuring RAID fail.

Thus, an object of the present invention is to provide a storage controller capable of effectively handling a failure of a storage device by considering the balance between costs required for maintenance and reliability based on the maintenance of the RAID level.

In order to achieve the foregoing object, the present invention is characterized in that, when a failure occurs in a plurality of storage devices arranged in advance, a device among the plurality of storage devices or an additional storage device added to a spare disk drive is configured as a spare storage device, and data of the failed storage device is reproduced and stored in the spare storage device.

In other words, the present invention provides a storage controller comprising a chassis, a plurality of storage devices disposed in the chassis, a controller for controlling the input and output of data between a host system and each of the storage devices, a peripheral device for supplying power to the controller, and a plurality of spare disk drives for fixing to the chassis an additional storage device to be added when any one of the plurality of storage devices fails. When any one of the plurality of storage devices fails, the controller reproduces and stores data of the failed storage device subject to a failure in a storage device configured as a spare storage device among the plurality of storage devices or the additional storage device.

In a preferred mode of the present invention, the additional storage device fixed to the spare disk drive is configured as a spare storage device for storing data of the failed storage device in preference to the plurality of storage devices. In addition, the plurality of storage devices comprise a data storage device and a spare storage device, and the additional storage device fixed to the spare disk drive is configured as a spare storage device for storing data of the failed storage device in substitute for the spare storage device.

Further, the plurality of storage devices comprise a data storage device and a spare storage device, the additional storage device fixed first among the additional storage devices fixed respectively to the plurality of spare disk drives is configured as a spare storage device for storing data of the failed storage device in substitute for the spare storage device, and the additional storage device fixed subsequently to the spare disk drive is configured as a spare storage device for storing data of the failed storage device in substitute for the additional storage device fixed first to the spare disk drive.

Moreover, when any one of the plurality of storage devices fails, the controller stores data of the failed storage device subject to a failure in a spare storage device among the plurality of storage devices, and, when an additional storage device is fixed to any one of the spare disk drives, [the controller] reproduces and stores subsequent data of the failed storage device in the additional storage device.

In addition, wherein, when any one of the plurality of storage devices fails, the controller reproduces data of the failed storage device subject to a failure and stores [the data] in a spare storage device among the plurality of storage devices on the condition that no additional storage device is fixed to any one of the spare disk drives, and, when an additional storage device is fixed to any one of the spare disk drives, [the controller] reproduces and stores subsequent data of the failed storage device in the additional storage device.

Further, when any one of the plurality of storage devices fails and an additional storage device is fixed to one of the spare disk drives, the controller reproduces data of the failed storage device and stores [the data] in the additional storage device fixed to one of the spare disk drives, and, when an additional storage device is fixed to the other of the spare disk drives, [the controller] reproduces and stores subsequent data of the failed storage device in the additional storage device.

Moreover, when any one of the plurality of storage devices fails, the controller outputs to an external device a warning signal prompting the addition of an additional storage device to any one of the spare disk drives, stores data of the failed storage device in a spare storage device among the plurality of storage devices, and, when an additional storage device is fixed to any one of the spare disk drives, [the controller] reproduces and stores subsequent data of the failed storage device in the additional storage device.

In addition, when any one of the plurality of storage devices fails, the controller outputs to an external device a warning signal prompting the addition of an additional storage device to any one of the spare disk drives on the condition that no additional storage device is fixed to any one of the spare disk drives, stores data of the failed storage device in a spare storage device among the plurality of storage devices, and, when an additional storage device is fixed to any one of the spare disk drives, [the controller] reproduces and stores subsequent data of the failed storage device in the additional storage device.

Further, when any one of the plurality of storage devices fails and an additional storage device is fixed to one of the spare disk drives, the controller outputs to an external device a warning signal prompting the addition of an additional storage device to the other of the spare disk drives, reproduces data of the failed storage device and stores [the data] in the additional storage device fixed to one of the spare disk drives, and, when an additional storage device is fixed to the other of the spare disk drives, [the controller] reproduces and stores subsequent data of the failed storage device in the additional storage device.

The present invention further provides a storage control method for controlling the sending and receiving of data between a storage apparatus comprising a plurality of storage devices mutually configuring a RAID group, a spare storage device for storing data of a failed storage device, and an additional storage device fixed to a plurality of spare disk drives, and a host computer. This storage control method comprises a first step of detecting failure of the storage device, a second step of reproducing data of the failed storage device based on data of another storage device configuring the RAID group, and copying [the data] to the spare storage device, a third step of processing an additional storage device fixed to one of the plurality of spare disk drives as a second spare storage device in substitute for the spare storage device, a fourth step of reproducing data of the failed storage device based on data of another storage device configuring the RAID group, and copying [the data] to the second spare storage device, a fifth step of processing an additional storage device fixed to one of the plurality of spare disk drives as a third spare storage device in substitute for the second spare storage device, and a sixth step of reproducing data of the failed storage device based on data of another storage device configuring the RAID group, and copying [the data] to the third spare storage device.

According to the present invention, is to possible to provide a storage controller capable of effectively handling a failure of a storage device by considering the balance between costs required for maintenance and reliability based on the maintenance of the RAID level.

DESCRIPTION OF DRAWINGS

FIG. 5A to FIG. 5I are configuration diagrams of a control table and a monitor table explaining the status of the storage device;

FIG. 6A to FIG. 6J are configuration diagrams of a control table and a monitor table explaining the status of the storage device;

DETAILED DESCRIPTION

Figure 1:
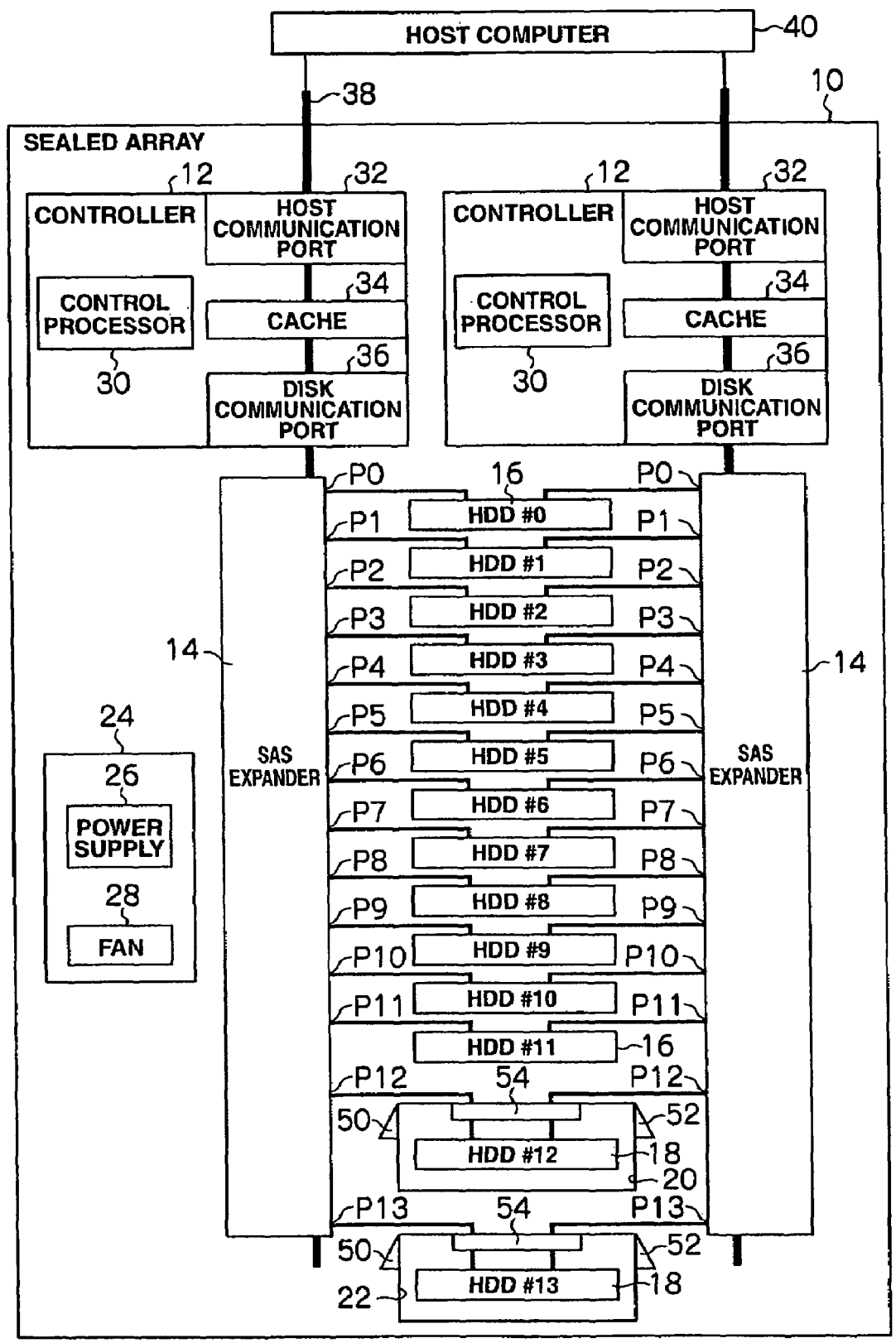
FIG. 1 is a block configuration diagram of a storage controller according to an embodiment of the present invention.

Embodiments of the present invention are now explained with reference to the attached drawings. FIG. 1 is a block configuration diagram of a storage controller applying an embodiment of the present invention. In FIG. 1, a storage controller (disk array apparatus) 10 comprises two controllers 12, two SAS (Serial Attached SCSI) expanders 14, a plurality of storage devices 16, spare disk drives 20, 22 for inserting an additional storage device 18, and a peripheral device 24. The peripheral device 24 comprises a power source 26, a fan 28 and the like, and power is supplied from the power source 26 to the respective components.

Each controller 12 comprises a control processor 30, a host communication port 32, a cache memory 34, and a disk communication port 36, and the host communication port 32 is connected to a host (host computer) 40 via a connection interface 38 such as a fibre channel. The control processor 30 in each controller 12 is configured as a controller that performs various operations according to programs, controls the input and output of data to and from the host computer 40 via the host communication port 32 and the connection interface 38, and controls the input and output of data to and from the storage device 16 and the additional storage device 18 via the disk communication port 36 and the SAS expander 14. Data processed by the control processor 30 is temporarily stored in the cache memory 34.

Figure 2:
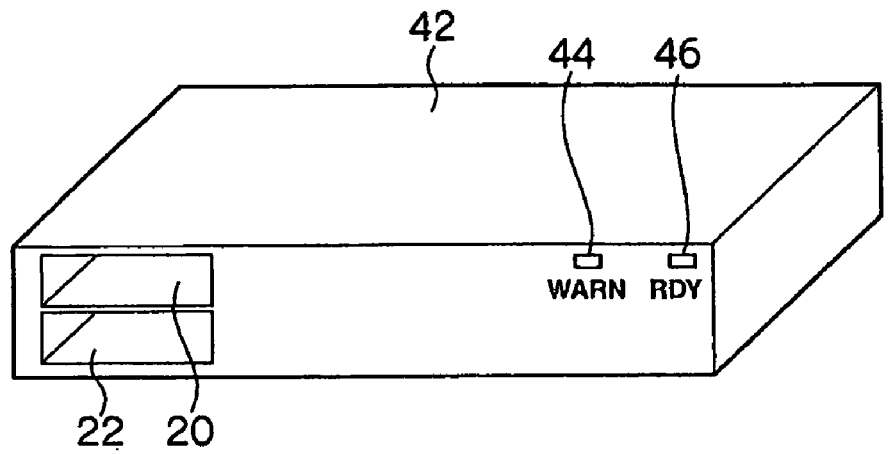
FIG. 2 is a perspective view of a chassis.

The twelve storage devices 16 are respectively connected to ports P0 to P11 of the SAS expander 14, and the nine storage device (storage devices #0 to #8) 16 connected to the ports P0 to port P8 configure a data drive (9D), the storage devices (storage devices #9 to #10) 16 connected respectively to the ports P9, P10 configure a parity drive (2P), and the storage device (storage device #11) 16 connected to the port P11 configures a spare drive (1S). In other words, the storage devices 16 configure RAID 6 with nine data drives (9D) and two parity drives (2P) and one spare drive (1P), and, as shown in FIG. 2, are stored and fixed inside a chassis 42. Incidentally, as the storage devices 16, storage apparatuses such as hard disk devices (HDD), flexible disk devices, and flash memories may be used.

The chassis 42 is formed in an approximate rectangle, and a warning lamp 44 and a ready display lamp 46 are mounted on the front face thereof, and the spare disk drives 20, 22 are also formed at the front face thereof. Each repair slot 20, 22 is formed such that an additional storage device 18 can be inserted as a repair drive (repair disk).

Figure 3A:
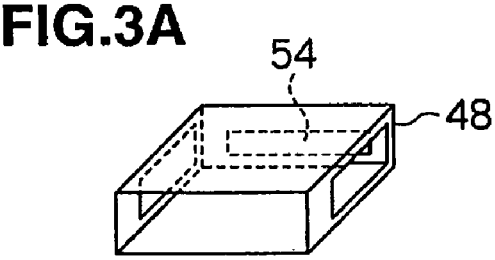
FIG. 3A is a transparent view of a canister.
Figure 3B:
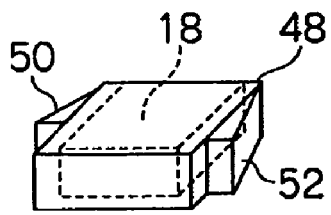
FIG. 3B is a perspective view of the canister.
Figure 3C:
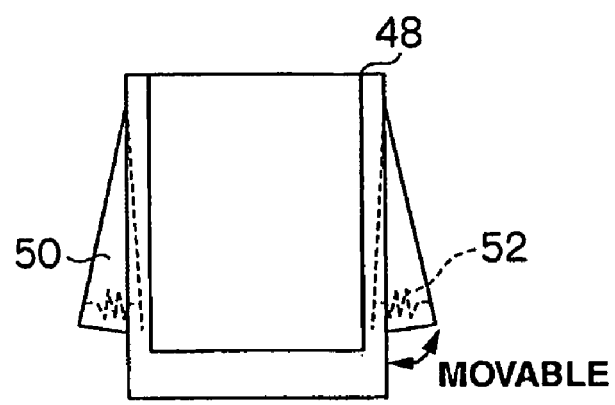
FIG. 3C is an enlarged view of the canister.

With each spare disk drive 20, 22, as shown in FIG. 3, return plates 50, 52 utilizing spring force are arranged in a canister 48 along the spare disk drives 20, 22. Each return plate 50, 52 facilitates the insertion of the additional storage device 18 when such additional storage device 18 is inserted into the spare disk drives 20, 22, but are configured such that the additional storage device 18 cannot be physically removed. A connector 54 is fixed to the side face of each spare disk drive 20, 22 for mounting the additional storage device 18, and the connectors 54 are respectively connected to the ports P12, P13 of the SAS expander 14.

Figure 4:
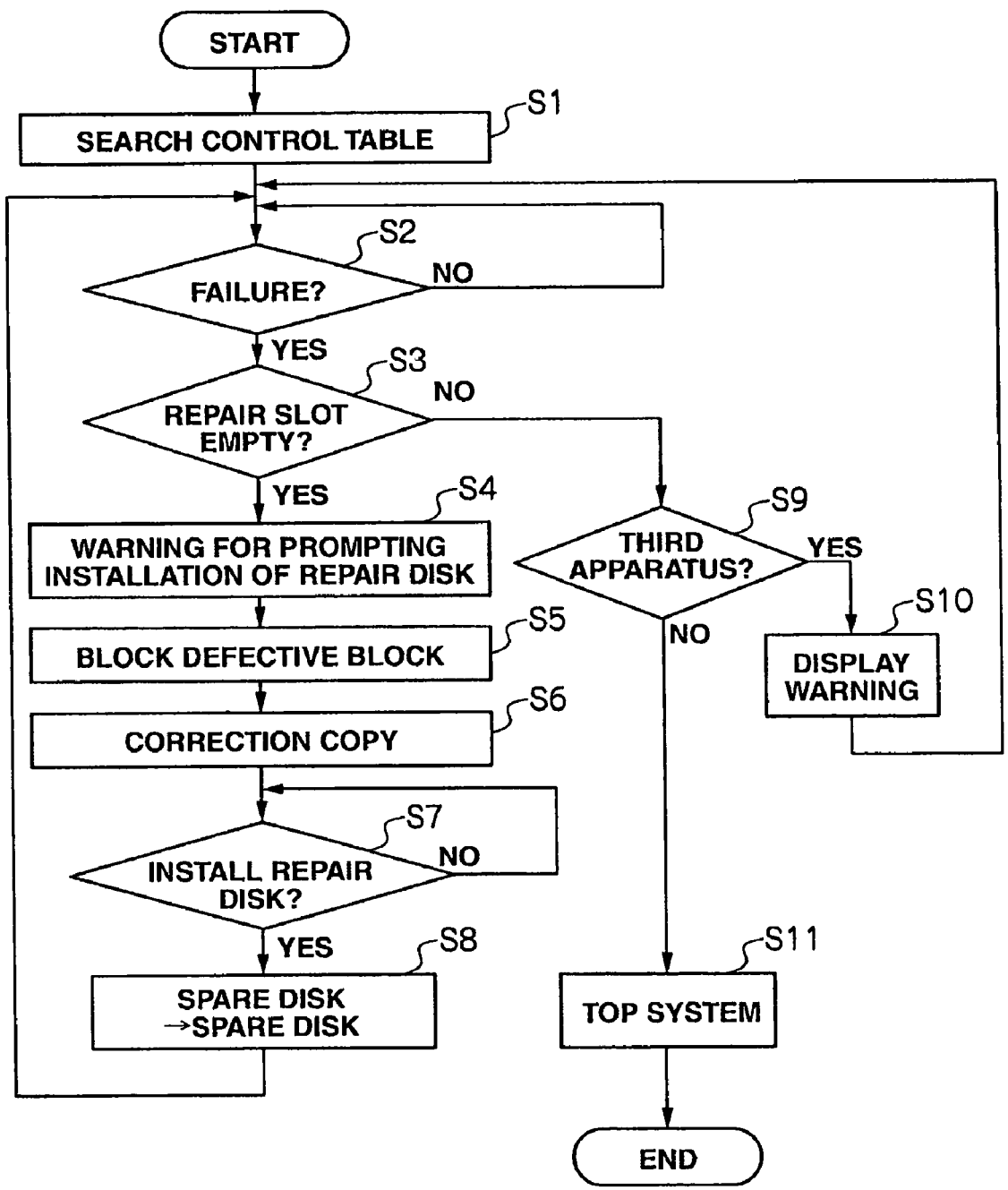
FIG. 4 is a flowchart explaining the processing when a failure occurs in a storage device.

The processing associated with a failure of the storage device 16 is now explained with reference to a flowchart shown in FIG. 4. This sequential processing is executed by the controller processor 30 in each controller 12.

Figure 5I:
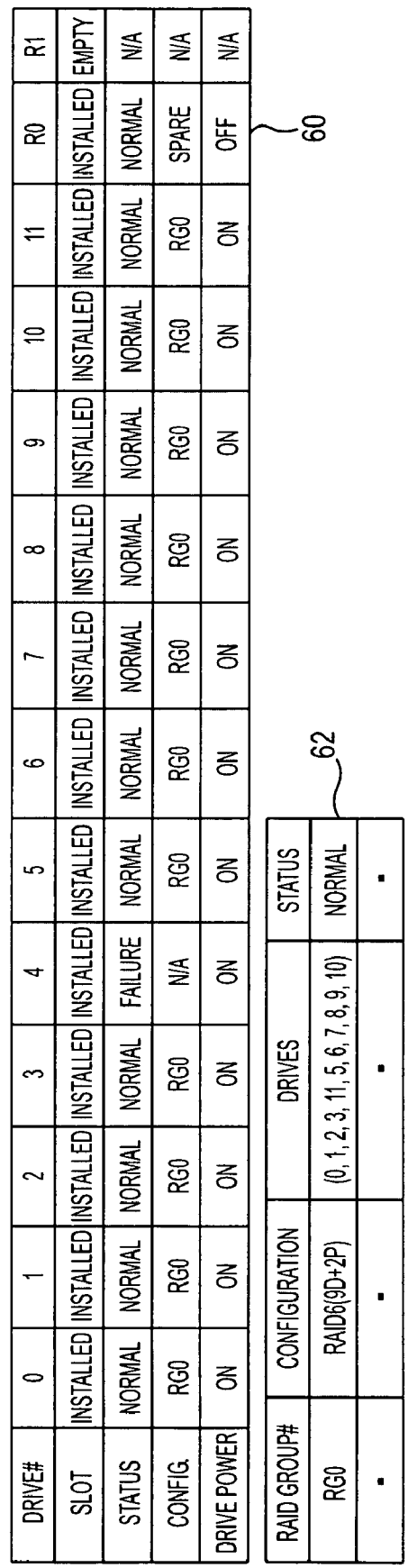

Foremost, according to fixed-interval processing or interrupt processing, the control processor 30 searches for a control table 60 and a monitor table 62 as shown in FIG. 5 as a table for managing the respective storage devices 16, retrieves data concerning the status of each storage device 16 (S1), determines that the storage devices (storage devices #0 to #10) 16 connected to the port P0 to port P10 have been installed and are the disk drives configuring RG (Raid Group) 0, determines that the storage device (storage device #11) 16 connected to the port P11 is a spare drive, and determines that the additional storage device 18 has not been installed in the spare disk drives 20, 22.

Subsequently, the control processor 30 executes the processing while constantly monitoring the control table 60 and the monitor table 62, and determines whether a failure occurred in the storage device 16 based on the status of the control table 60 and the monitor table 62 (S2). When the control processor 30 determines that a failure has not occurred in the storage device 16, it determines that the storage devices 16 are of a normal status and are configuring RAID 6 (9D+2P), and executes the processing at step S2 once again.

Meanwhile, when the control processor 30 determines that one of the storage devices 16 has failed, for instance, when the storage device (storage device #4) 16 connected to the port P4 fails (Failure) (refer to FIG. 5B), it determines whether the spare disk drives 20, 22 are empty (S3). Here, the storage devices 16 will be of a RAID 5 (9D+1P) configuration.

When the control processor 30 determines that the spare disk drives 20, 22 are empty, it illuminates the warning lamp 44 to prompt the insertion of a repair drive (additional storage device 18) into one of the spare disk drives 20, 22; for instance, into the spare disk drive 20, changes the status of the monitor table 62 to "Warning", RAID 5 (9D+1P) (S4), blocks the storage device (storage device #4) 16 connected to the port P4 as a failed storage device (OFF) (S5), activates the storage device (storage device #11) 16 connected to the port P11 as a spare drive (1S) (refer to FIG. 5C, FIG. 5D), and reproduces the data of the failed storage device (storage device #4) 16 from the storage device 16 configuring a parity drive and the storage device 16 configuring a data drive and copies such data to the spare drive (1S) (correction copy) (S6). The status of the control table 60 and the monitor table 62 at such time is shown in FIG. 5E.

Subsequently, the control processor 30 determines whether a repair disk has been installed in the spare disk drive 20 until a repair drive (repair disk) is installed in the spare disk drive 20 (S7). Here, when an additional storage device (repair disk) 18 is installed in the spare disk drive 20, the control processor 30 determines this status (refer to FIG. 5F and FIG. 5G), and recognizes the installed additional storage device (repair disk) 18 as a spare disk (1S) (S8). The control processor 30, as shown in FIG. 5F to FIG. 5I, determines that the storage devices 16 have returned to a normal status, and the storage devices 16 will be of a RAID 6 (9D+2B) configuration.

After recognizing the additional storage device (repair disk) 18 installed in the spare disk drive 20 as a spare disk (1S), the control processor 30 determines whether a failure occurred in the storage device 16 while monitoring the control table 60 and the monitor table 62 (S2). When a failure has occurred, for instance, when the storage device (storage device #9) 16 connected to the port P9 fails (Failure) as shown in FIG. 6A, the control processor 30 determines whether the spare disk drive 22 is empty (S3), and, when the spare disk drive 22 is empty, it illuminates the warning lamp 44 for prompting the insertion of the repair drive (additional storage device 18) into the spare disk drive 22, changes the status of the monitor table 62 to "Warning", RAID 5 (9D+1P) (S4), blocks the storage device (storage device #9) 16 connected to the port P9 as a failed storage device (OFF) (S5), reproduces the data of the failed storage device (storage device #9) 16 from the storage device 16 configuring the parity disk and the storage device 16 configuring the data drive, and copies such data to the additional storage device (spare disk) 18 connected to the port P12 (correction copy) (S6). The status at such time is shown in FIG. 6B to FIG. 6F.

Subsequently, the control processor 30 determines whether a repair disk has been installed into the spare disk drive 22 until a repair disk is installed in to the spare disk drive 22 (S7). Here, when the additional storage device (repair disk) 18 is installed into the spare disk drive 22, the control processor 30 determines the status (refer to FIG. 6F and FIG. 6G), and recognizes the installed additional storage device (repair disk) 18 as a spare disk (1S) (S8). The control processor 30, as shown in FIG. 6G, determines that the storage devices 16 have returned to a normal status, and the storage devices 16 will be of a RAID 6 (9D+2P) configuration.

After recognizing the additional storage device (repair disk) 18 installed in the spare disk drive 22 as a spare disk (1S), the control processor 30 determines whether a failure occurred in the storage device 16 while monitoring the control table 60 and the monitor table 62 (S2). When a failure has occurred, for instance, when the storage device (storage device #6) 16 connected to the port P6 fails (Failure) as shown in FIG. 6I, the control processor 30 determines whether the spare disk drives 20, 22 are empty (S3), and, when the spare disk drives 20, 22 are not empty, it determines whether the failed storage device 16 is the third storage device that failed (S9). When the control processor 30 determines that it is the third storage device that failed, it displays a warning such as "The redundancy can no longer be maintained with spare disk drives. Please install a new device" on a monitor display since it determines that the storage device (storage device #4) 16 connected to the port P4, the storage device (storage device

9) 16 connected to the port P9, and also the storage device (storage device #6) 16 connected to the port P6 have all failed (Failure) (S10), and returns to the processing at step S2.

Subsequently, the control processor 30 further determines whether a failure occurred in the storage device 16 while monitoring the control table 60 and the monitor table 62 (S2). When a failure has occurred, for instance, when the storage device (storage device #5) 16 connected to the port P5 fails (Failure), the control processor 30 determines whether the spare disk drives 20, 22 are empty (S3), and, when the spare disk drives 20, 22 are not empty, it determines whether the failed storage device 16 is the third storage device that failed (S9). When the control processor 30 determines that it is the fourth storage device that failed; that is, when the storage device (storage device #5) 16 connected to the port P5 also failed in addition to the storage devices (storage devices #4, #6, #9) 16 connected to the ports P4, P6, P9, it stops the system (S11), and ends the processing of this routine. The status at such time is shown in FIG. 6J.

Figure 7A:
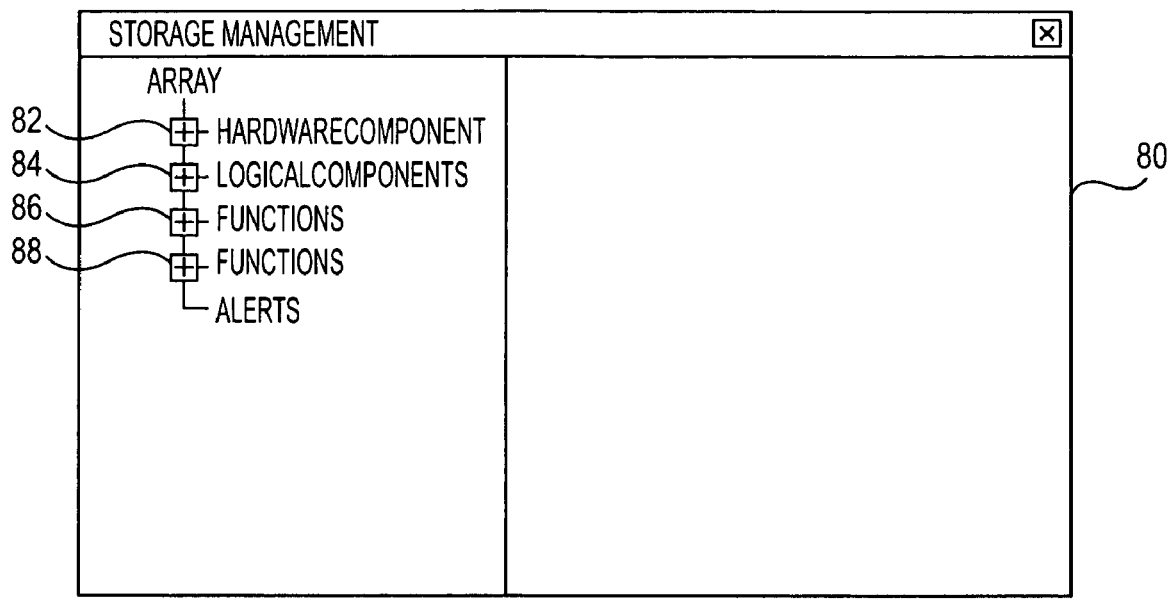
FIG. 7A to FIG. 7H are diagrams explaining a display example of a maintenance display.
Figure 7B:
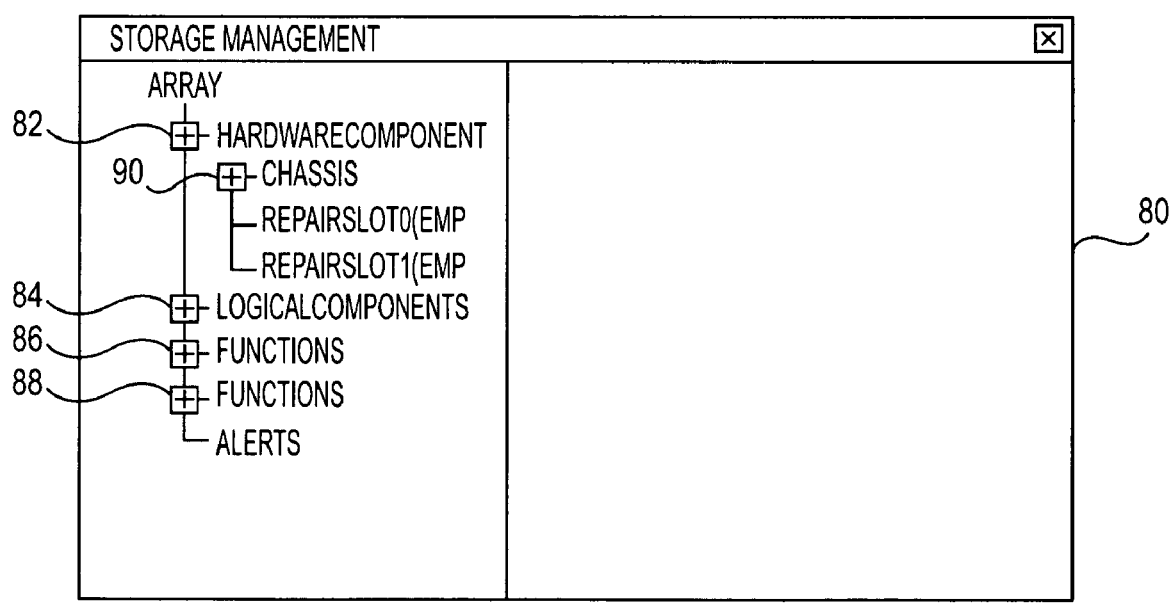
Figure 7C:
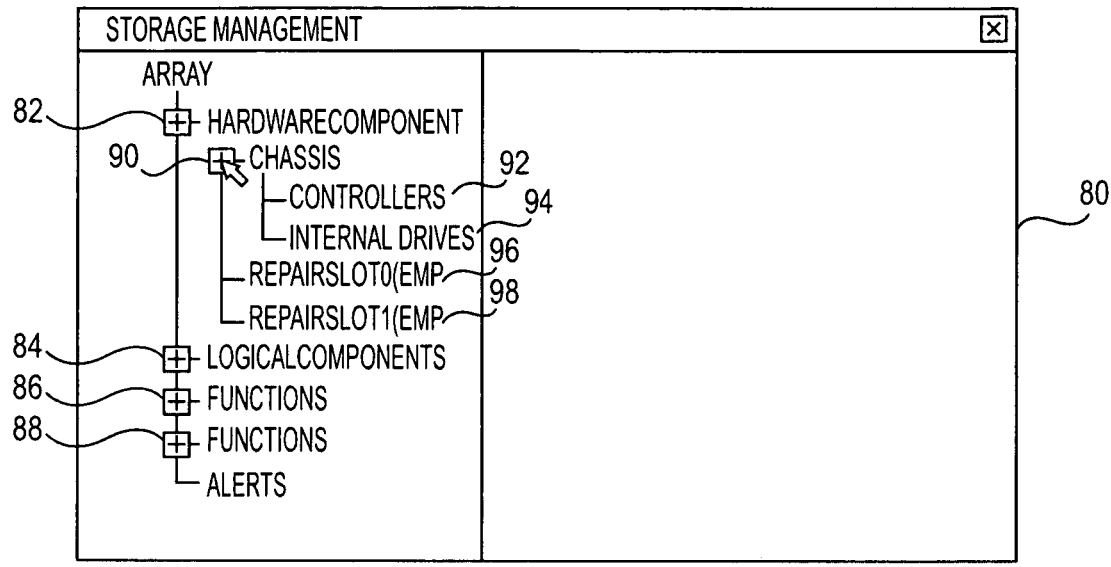
Figure 7D:
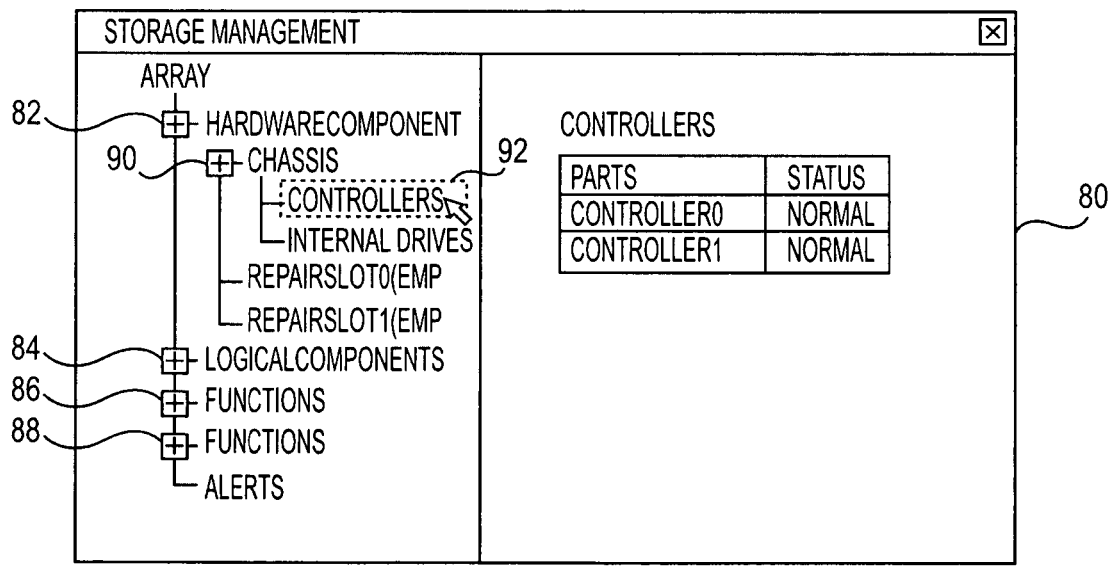
Figure 7E:
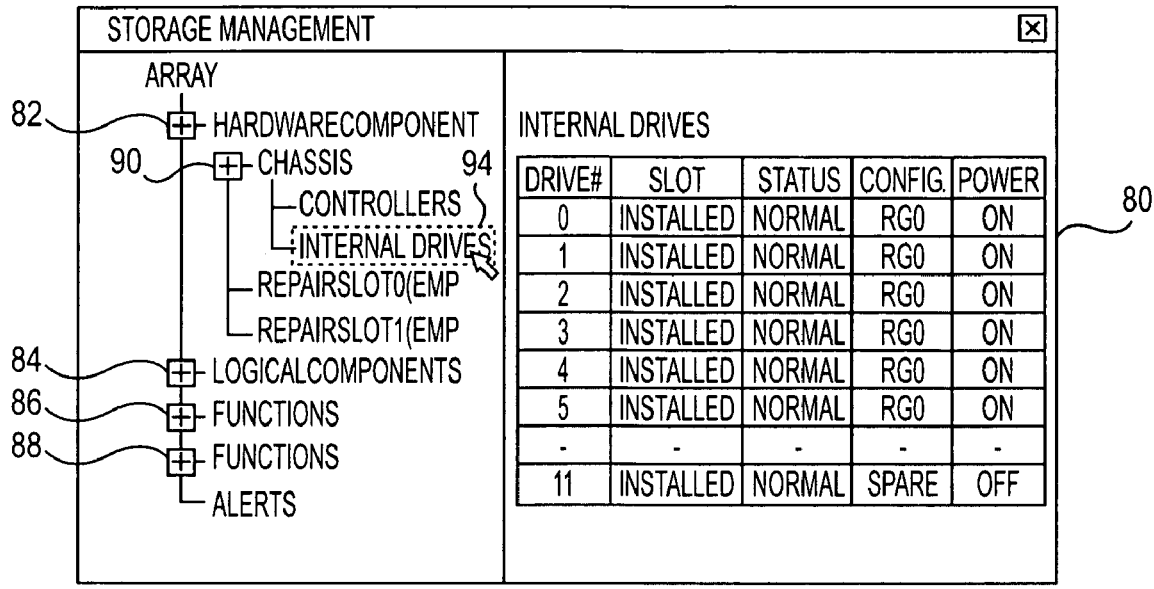

A display example of displaying the processing contents of the processor 130 on a screen of the display 80 connected to the controller 12 is now explained. For example, as shown in FIG. 7A, factors concerning the hardware configuration 82, logical configuration 84, and functions 86, 88 are displayed in an array on the screen of the display 80. Here, when the hardware configuration 82 is clicked, the chassis 90 is displayed (refer to FIG. 7B). When the chassis 90 is subsequently clicked, as shown in FIG. 7C, the controller 92, internal device 94, and spare disk drives 96, 98 are displayed. Here, when the controller 92 is clicked, as shown in FIG. 7D, the status of the controller is displayed, and, when the internal device 94 is clicked, as shown in FIG. 7E, the status of each storage device 16 is displayed.

Figure 7F:
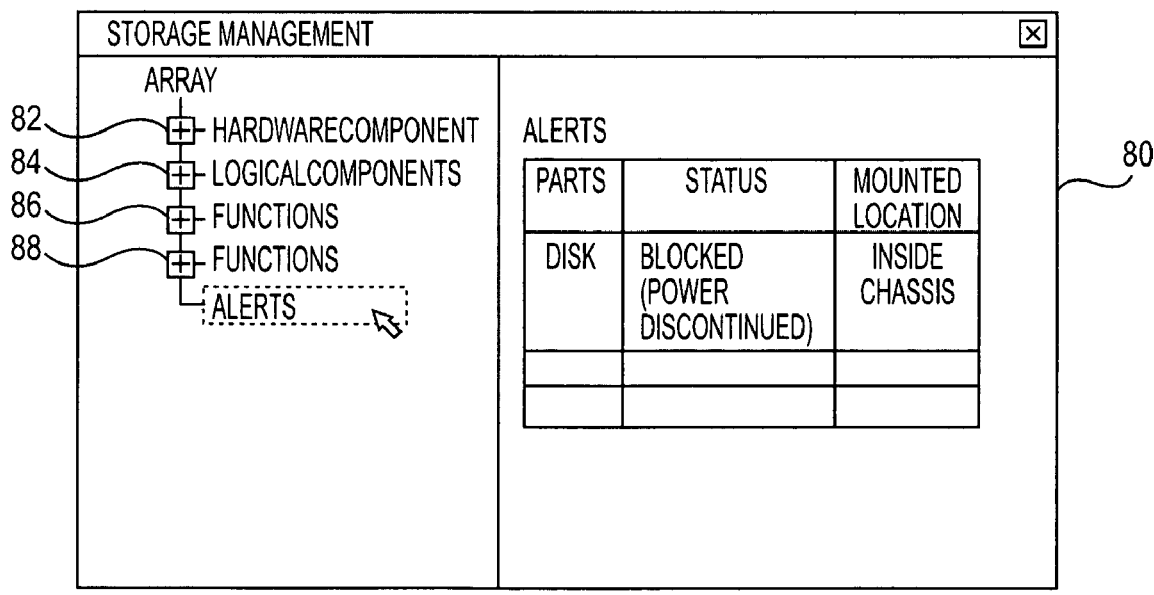
Figure 7G:
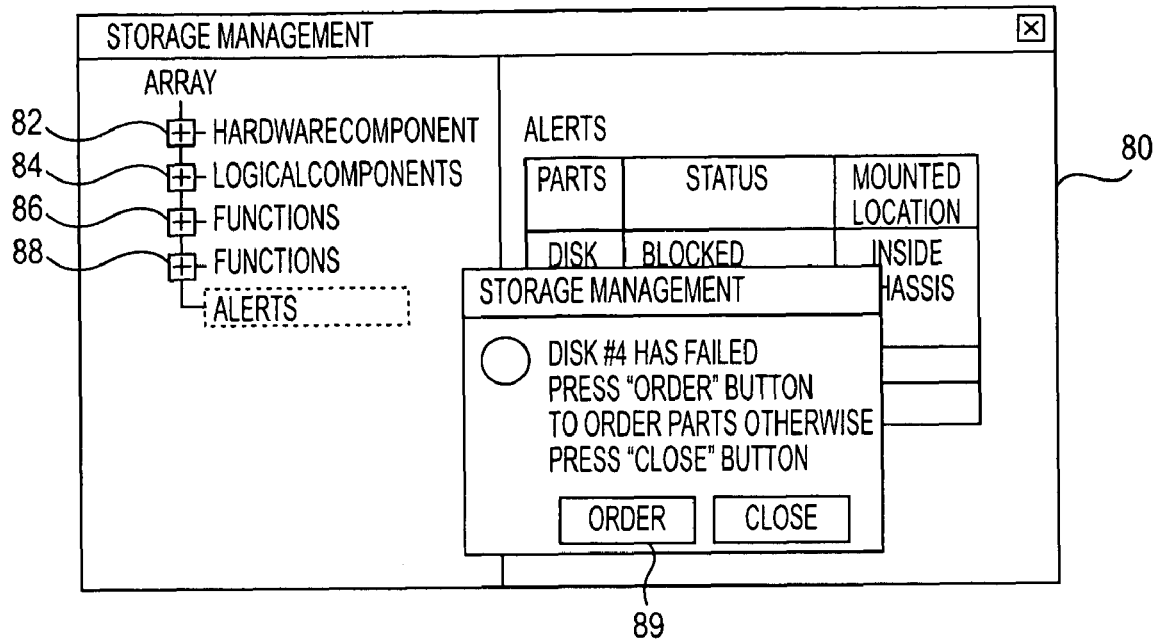
Figure 7H:
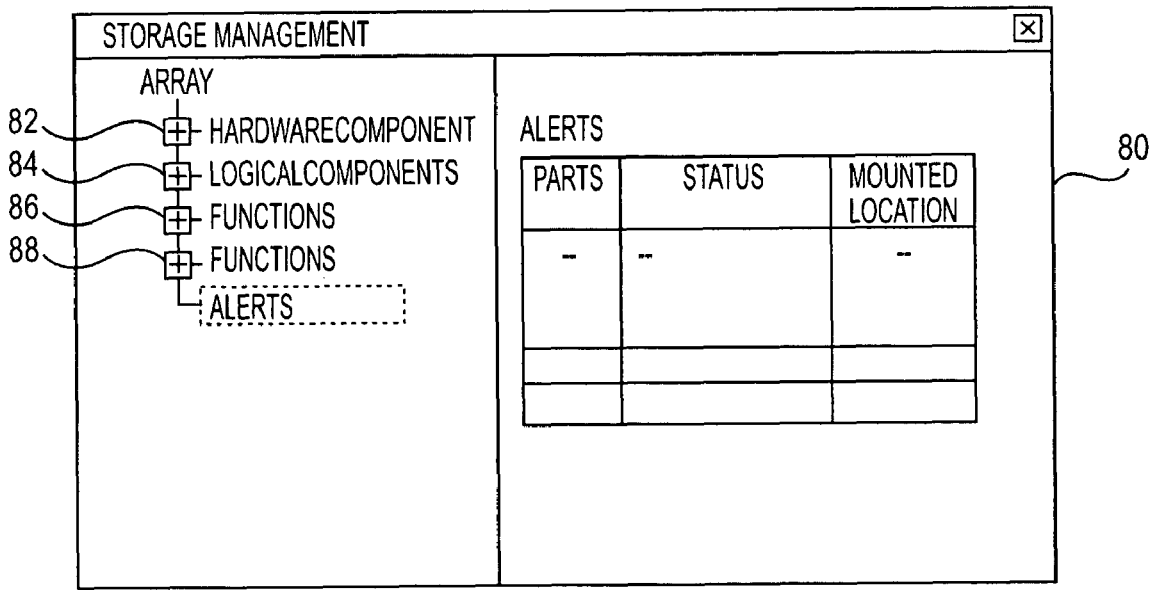

In addition, when the function 88 is clicked, as shown in FIG. 7F, the contents thereof are displayed as an alert. Further, when the storage device (storage device #4) 16 connected to the port P4 fails, as shown in FIG. 7G, a message to such effect is displayed. Here, by operating the "Order" button 89, the user is linked to an online Website so such user can order parts. When ending the processing, the screen shown in FIG. 7H will be displayed.

Figure 8A:
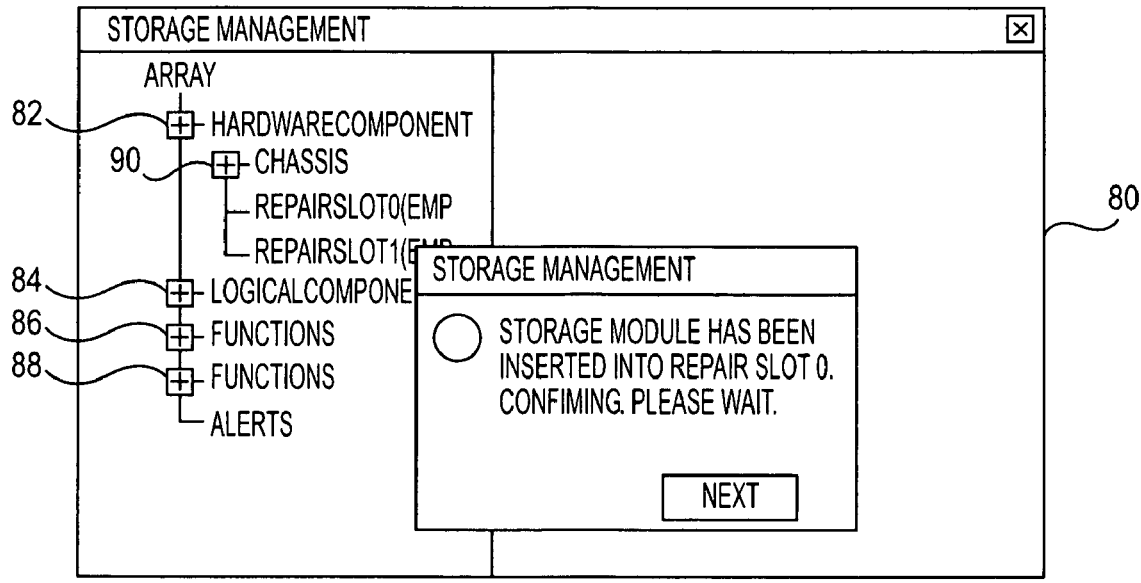
FIG. 8A to FIG. 8K are diagrams explaining a display example of a maintenance display.
Figure 8B:
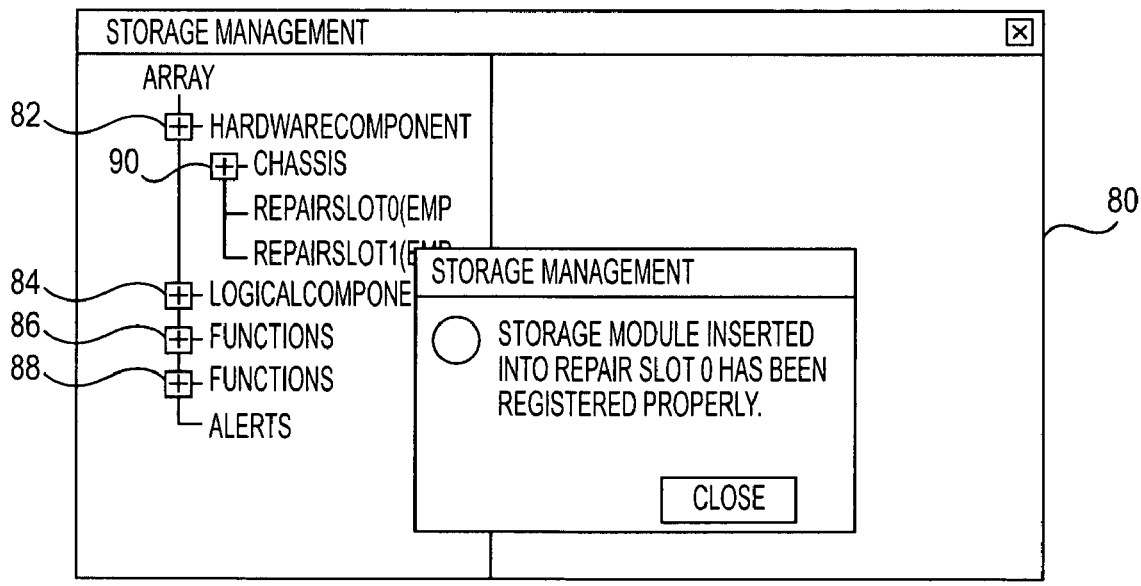

Meanwhile, when a repair drive is inserted into the spare disk drives 20, 22, as shown in FIG. 8A, the screen of the display 80 displays a message to the effect that the repair disk has been inserted. Thereafter, when the repair drive is recognized as a spare drive, as shown in FIG. 8B, the screen of the display 80 displays a message to such effect.

Figure 8C:
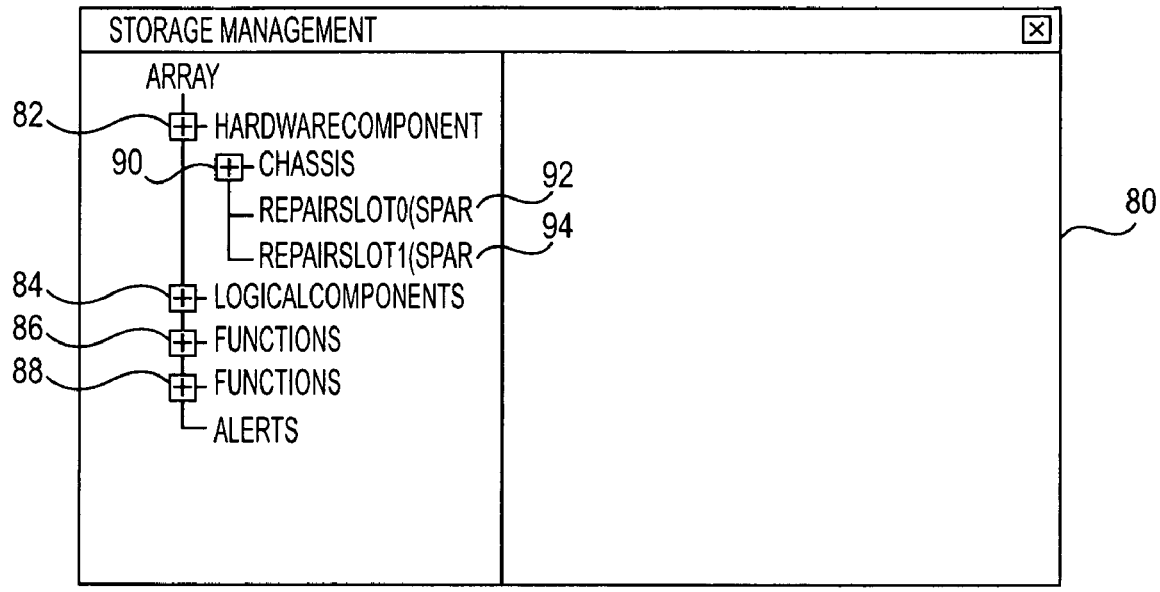
Figure 8D:
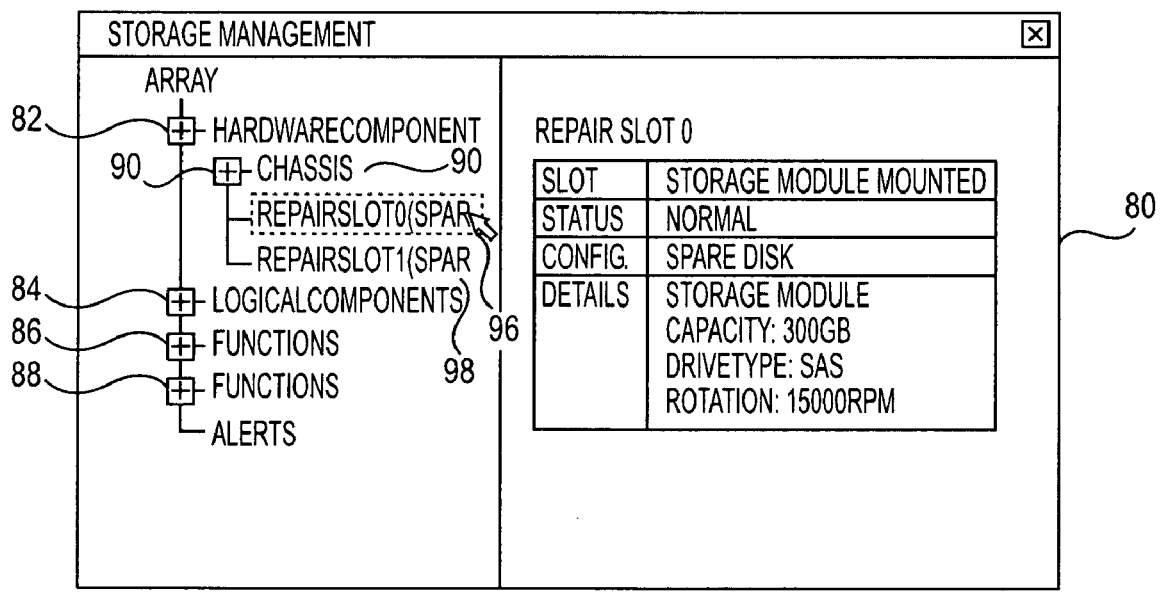
Figure 8E:
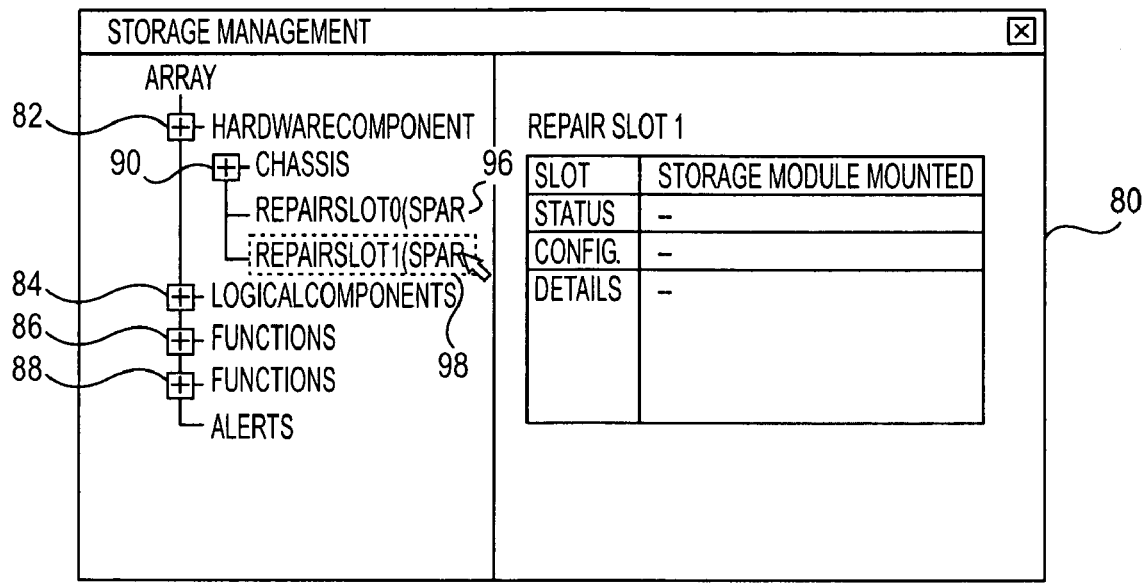

Meanwhile, when an operation is conducted to update the tree display, as shown in FIG. 8C, a tree display update screen is displayed on the display 80. Subsequently, when a mouse is used to select a spare disk drive 96 corresponding to the spare disk drive 20, information concerning the spare disk drive 20 is displayed on the screen of the display 80. Subsequently, when a mouse is used to select a spare disk drive 98 corresponding to the spare disk drive 22, as shown in FIG. 8E, information concerning the spare disk drive 22 is displayed on the screen of the display 80.

Figure 8F:
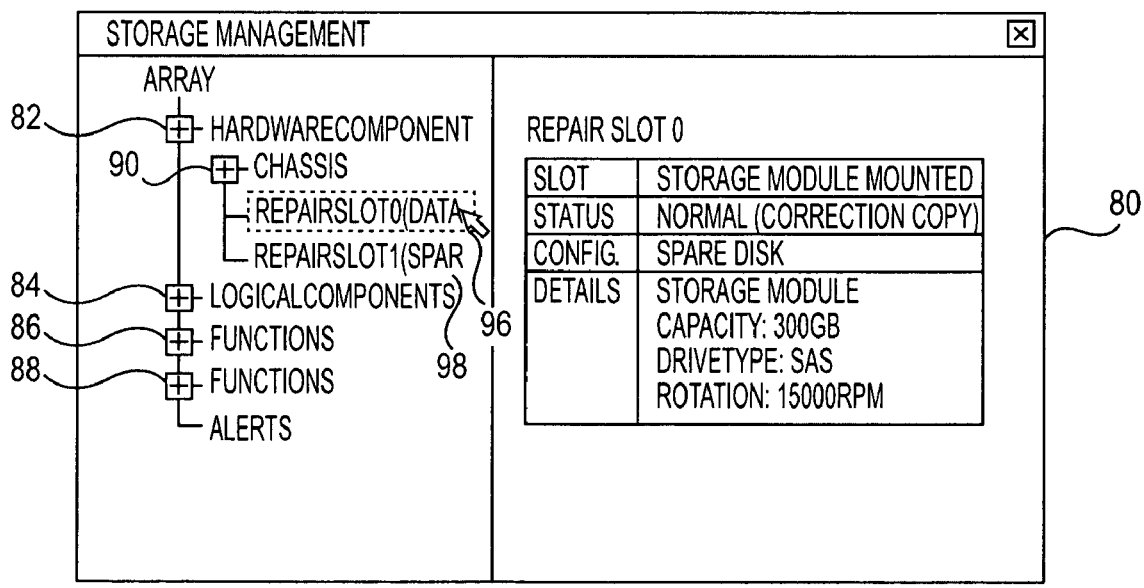
Figure 8G:
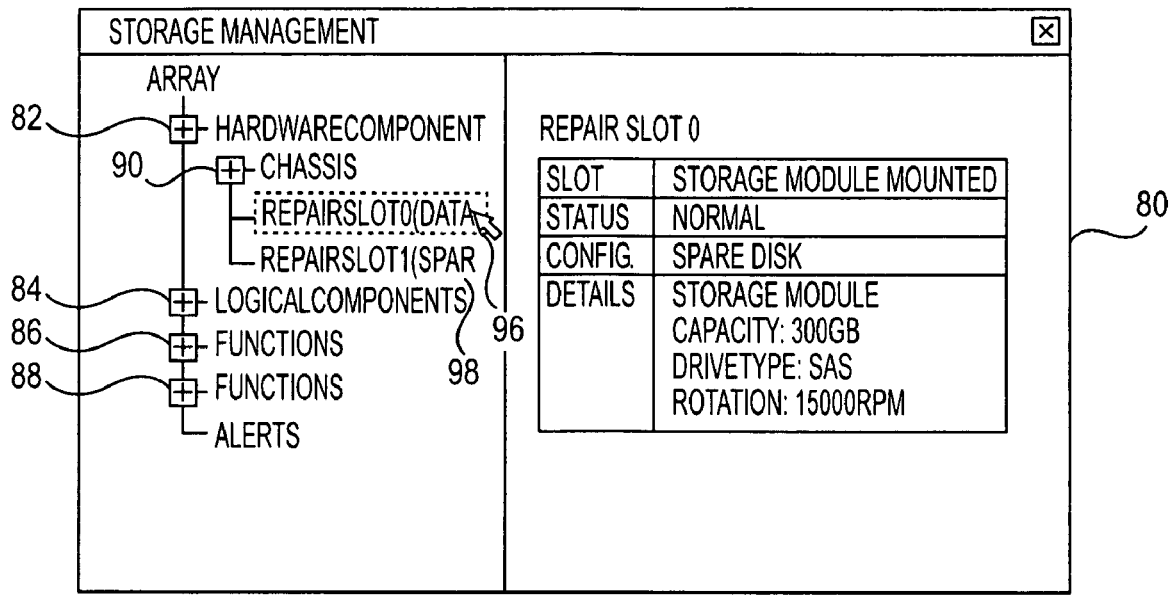
Figure 8H:
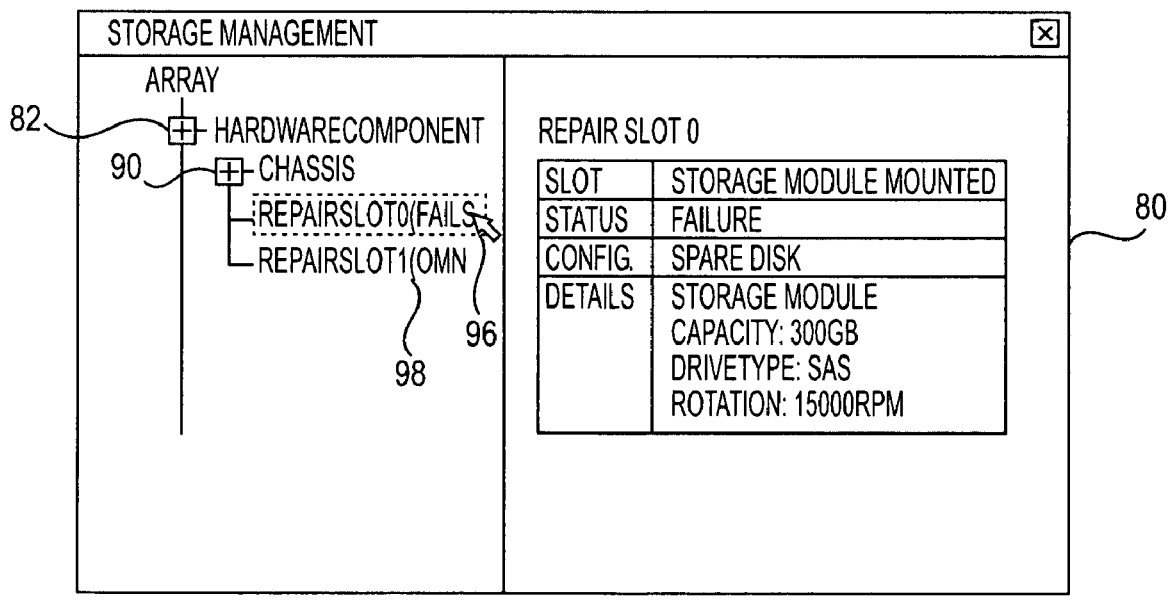

Further, when correction copy is being performed, as shown in FIG. 8F, a message to such effect is displayed on the screen of the display 80, and, when the repair disk is recognized as a spare disk, a message to such effect is displayed on the screen of the display 80 (refer to FIG. 8G), and, when the repair disk installed in the spare disk drive 20 also fails, a message to such effect is displayed on the screen of the display 80 (refer to FIG. 8H).

Figure 8I:
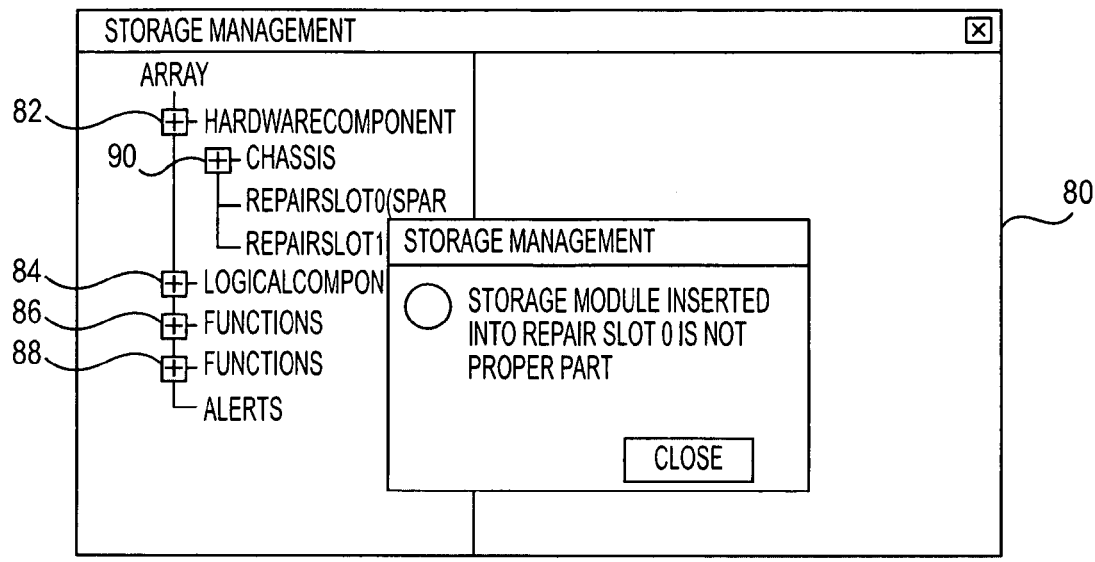
Figure 8J:
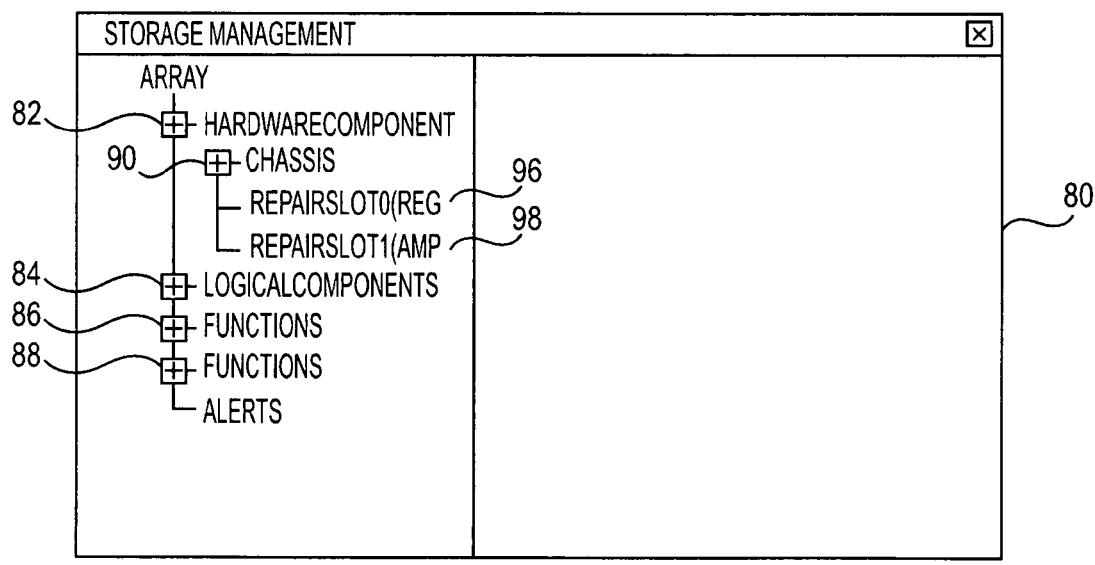
Figure 8K:
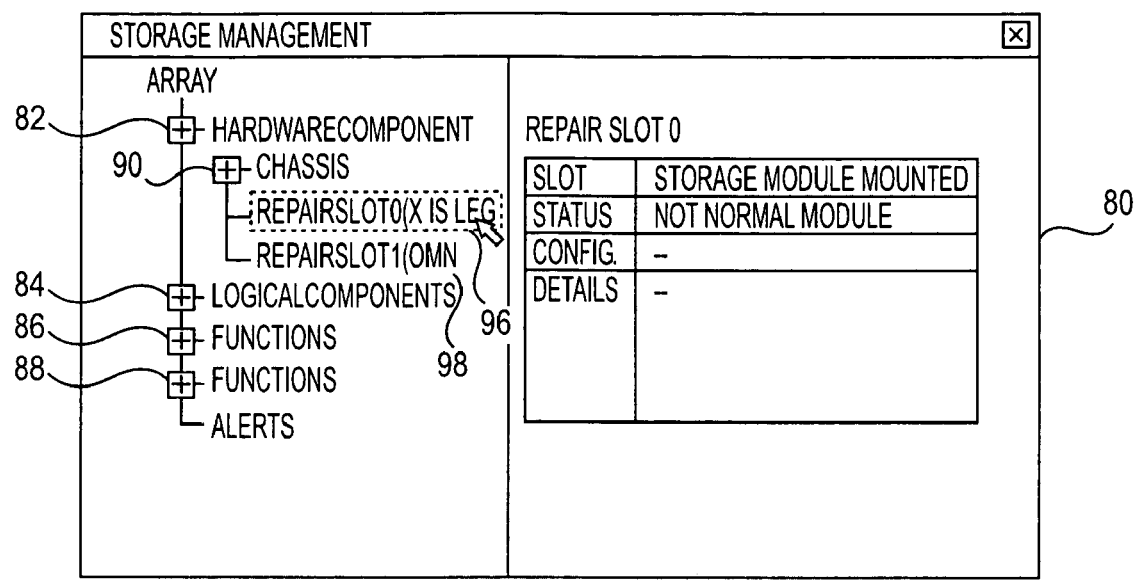

Meanwhile, when a nonstandard repair disk is installed in the spare disk drives 20, 22, a message to such effect is displayed on the screen of the display 80 (refer to FIG. 8I). When the user thereafter performs the tree display update operation, a message to such effect is displayed on the screen of the display 80 (refer to FIG. 8J), and, when a mouse is used to operate the spare disk drive 96, a message to the effect that the repair disk installed in the spare disk drive 20 is not a proper repair disk is displayed on the screen of the display 80 (refer to FIG. 8K).

According to the present embodiment, spare disk drives 20, 22 are provided to the chassis 42 for storing the storage devices 16, and, when any one of the storage devices 16 configuring RAID 6 level fails, the storage controller copies data of the failed storage device to a spare storage device, and recognizes an additional storage device inserted into the spare disk drive as a spare storage device so as to maintain the RAID 6 level. Thereafter, when the foregoing storage device 16 fails, the storage controller reproduces data of the failed storage device 16, copies this data to the additional storage device 18 inserted into the spare disk drive 20, and recognizes the additional storage device 18 inserted into the spare disk drive 22 as a spare storage device so as to maintain the RAID 6 level. Subsequently, when the foregoing storage device 16 fails, the storage controller reproduces data of the failed storage device and copies this data to the additional storage device 18 inserted into the spare disk drive 22 so as to maintain the RAID 6 is level.

We claim:

1. A storage controller, comprising:
a chassis;
a plurality of storage devices disposed in said chassis;
a controller for controlling the input and output of data between a host system and each of said storage devices;
a peripheral device for supplying power to said controller; and
a plurality of repair slots, to which a plurality of repair disk drives is inserted when any one of said plurality of storage devices fails,
wherein, when any one of said plurality of storage devices fails, the controller determines whether the repair slots are empty,
wherein when the controller determines that the repair slots are empty, an indication is provided to prompt insertion of a repair disk drive into one of the repair slots
wherein when the repair disk drive is inserted in the one repair slot, the controller recognizes the inserted repair disk drive as a spare disk drive, configures the storage devices and the repair disk drive as a RAID configuration, and reproduces and stores data of the failed storage device among said plurality of storage devices or said repair disk drive according to the RAID configuration,
wherein when the repair slots are not empty and the number of failed storage devices is greater by one than the number of repair slots, the controller provides an indication that redundancy can no longer be maintained with the repair slots, and
wherein when the repair slots are not empty and the number of failed storage devices is greater by two or more than the number of the repair slots, the controller stops the system.

2. The storage controller according to claim 1, wherein the repair disk drive inserted into said spare disk drive is configured as a spare storage device for storing data of said failed storage device in preference to said plurality of storage devices.

3. The storage controller according to claim 1, wherein said plurality of storage devices comprise storage devices configuring RAID and a spare storage device for storing data of the failed storage device subject to a failure, and the repair disk drive inserted into said spare disk drive is configured as a spare storage device for storing data of said failed storage device in substitute for said spare storage device.

4. The storage controller according to claim 1, wherein said plurality of storage devices comprise storage devices configuring RAID, and a spare storage device for storing data of the failed storage device subject to a failure, the repair disk drive fixed first among repair disk drives fixed respectively to said plurality of spare disk drives is configured as a spare storage device for storing data of said failed storage device in substitute for said spare storage device, and the repair disk drive fixed subsequently to said spare disk drive is configured as a spare storage device for storing data of said failed storage device in substitute for the repair disk drive fixed first to said spare disk drive.

5. The storage controller according to claim 1, wherein, when any one of said plurality of storage devices fails, said controller stores data of the failed storage device subject to a failure in a spare storage device among said plurality of storage devices, and, when a repair disk drive is fixed to any one of said spare disk drives, said controller reproduces and stores subsequent data of the failed storage device in said repair disk drive.

6. The storage controller according to claim 1, wherein, when any one of said plurality of storage devices fails, said controller reproduces data of the failed storage device subject to a failure and stores said data in a spare storage device among said plurality of storage devices on the condition that no repair disk drive is fixed to any one of said spare disk drives, and, when a repair disk drive is fixed to any one of said spare disk drives, said controller reproduces and stores subsequent data of the failed storage device in said repair disk drive.

7. The storage controller according to claim 1, wherein, when any one of said plurality of storage devices fails and a repair disk drive is fixed to one of said spare disk drives, said controller reproduces data of the failed storage device and stores said data in the repair disk drive fixed to one of said spare disk drives, and, when an additional repair disk drive is fixed to the other of said spare disk drives, said controller reproduces and stores subsequent data of the failed storage device in said additional repair disk drive.

8. The storage controller according to claim 1, wherein, when any one of said plurality of storage devices fails, said controller outputs to an external device a warning signal prompting the addition of an additional repair disk drive to any one of said spare disk drives, stores data of the failed storage device in a spare storage device among said plurality of storage devices, and, when an additional repair disk drive is fixed to any one of said spare disk drives, said controller reproduces and stores subsequent data of the failed storage device in said additional repair disk drive.

9. The storage controller according to claim 1, wherein, when any one of said plurality of storage devices fails, said controller outputs to an external device a warning signal prompting the addition of an additional repair disk drive to any one of said spare disk drives on the condition that no additional repair disk drive is fixed to any one of said spare disk drives, stores data of the failed storage device in a spare storage device among said plurality of storage devices, and, when an additional repair disk drive is fixed to any one of said spare disk drives, said controller reproduces and stores subsequent data of the failed storage device in said additional repair disk drive.

10. The storage controller according to claim 1, wherein, when any one of said plurality of storage devices fails and an additional repair disk drive is fixed to one of said spare disk drives, said controller outputs to an external device a warning signal prompting the addition of an additional repair disk drive to the other of said spare disk drives, reproduces data of the failed storage device and stores said data in the additional repair disk drive fixed to one of said spare disk drives, and, when an additional repair disk drive is fixed to the other of said spare disk drives, said controller reproduces and stores subsequent data of the failed storage device in said additional repair disk drive storage device.

* * * * *